United States Patent
Steele et al.

(10) Patent No.: US 7,373,399 B2
(45) Date of Patent: May 13, 2008

(54) SYSTEM AND METHOD FOR AN ENTERPRISE-TO-ENTERPRISE COMPARE WITHIN A UTILITY DATA CENTER (UDC)

(75) Inventors: Doug Steele, Fort Collins, CO (US); Katherine Hogan, Fort Collins, CO (US); Rheid Schloss, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 585 days.

(21) Appl. No.: 10/140,933

(22) Filed: May 9, 2002

(65) Prior Publication Data

US 2003/0212775 A1    Nov. 13, 2003

(51) Int. Cl.
 *G06F 15/173* (2006.01)
(52) U.S. Cl. ..................... 709/223; 709/224
(58) Field of Classification Search .............. 709/223, 709/224
 See application file for complete search history.

(56) References Cited

U.S. PATENT DOCUMENTS

| | | | |
|---|---|---|---|
| 5,954,797 A * | 9/1999 | Sidey ..................... 709/223 |
| 6,058,260 A * | 5/2000 | Brockel et al. ............... 703/4 |
| 6,205,465 B1 * | 3/2001 | Schoening et al. ......... 718/102 |
| 6,314,460 B1 * | 11/2001 | Knight et al. ............... 709/220 |
| 6,577,642 B1 * | 6/2003 | Fijolek et al. ............... 370/465 |
| 7,031,941 B2 * | 4/2006 | Garrow et al. ................ 705/50 |
| 7,124,438 B2 * | 10/2006 | Judge et al. .................. 726/22 |
| 7,143,151 B1 * | 11/2006 | Kayashima et al. ........ 709/223 |
| 2001/0027442 A1 * | 10/2001 | Krahn et al. .................. 705/51 |
| 2002/0026505 A1 * | 2/2002 | Terry ........................... 709/221 |
| 2002/0078382 A1 * | 6/2002 | Sheikh et al. ................ 713/201 |

* cited by examiner

*Primary Examiner*—Larry D. Donaghue
*Assistant Examiner*—Asghar Bilgrami

(57) ABSTRACT

A system and method for an enterprise-to-enterprise compare within a data center. Image backups are typically used to identify the configuration of each system within a data center. The configuration data for one or more enterprises may be combined with feedback and/or performance data to determine an known good model configuration for a given enterprise type. Enterprises within the data center stray from the original configuration and are compared with an enterprise model to yield recommendations for upgrades or maintenance or component substitution.

16 Claims, 11 Drawing Sheets

SYSTEM AND METHOD FOR AN ENTERPRISE-TO-ENTERPRISE COMPARE WITHIN A UTILITY DATA CENTER (UDC)

CROSS REFERENCE TO RELATED APPLICATIONS

This application is related to U.S. patent application Ser. No. 10/140,932 to D. Steele, R. Campbell, and K.C. Hogan, entitled "System And Method To Combine A Product Database With An Existing Enterprise To Model Best Usage Of Funds For The Enterprise"; U.S. patent application Ser. No. 10/141,072 to D. Steele, R. Schloss, R. Campbell, and K. Hogan, entitled "System And Method For Remotely Monitoring And Deploying Virtual Support Services Across Multiple Virtual LANs (VLANS) Within A Data Center"; and U.S. patent application Ser. No. 10/140,931 to D. Steele, K. Hogan, R. Campbell, and A. Squassabia, entitled "System And Method For Analyzing Data Center Enterprise Information Via Backup Images", all applications filed concurrently herewith by separate cover and assigned to a common assignee, and herein incorporated by reference in their entirety.

BACKGROUND

Data centers and timesharing have been used for over 40 years in the computing industry. Timesharing, the concept of linking a large numbers of users to a single computer via remote terminals, was developed at MIT in the late 1950s and early 1960s. A popular timesharing system in the late 1970's to early 1980's was the CDC Cybernet network. Many other networks existed. The total computing power of large mainframe computers was typically more than the average user needed. It was therefore more efficient and economical to lease time and resources on a shared network. Each user was allotted a certain unit of time within a larger unit of time. For instance, in one second, 5 users might be allotted 200 microseconds apiece, hence, the term timesharing. These early mainframes were very large and often needed to be housed in separate rooms with their own climate control.

As hardware costs and size came down, mini-computers and personal computers began to be popular. The users had more control over their resources, and often did not need the computing power of the large mainframes. These smaller computers were often linked together in a local area network (LAN) so that some resources could be shared (e.g., printers) and so that users of the computers could more easily communicate with one another (e.g., electronic mail, or e-mail, instant chat services as in the PHONE facility available on the DEC VAX computers).

As the Information Technology (IT) industry matured, software applications became more memory, CPU and resource intensive. With the advent of a global, distributed computer networks, i.e., the Internet, more users were using more software applications, network resources and communication tools than ever before. Maintaining and administering the hardware and software on these networks could be a nightmare for a small organization. Thus, there has been a push in the industry toward open applications, interoperable code and a re-centralization of both hardware and software assets. This re-centralization would enable end users to operate sophisticated hardware and software systems, eliminating the need to be entirely computer and network literate, and also eliminating direct maintenance and upgrade costs.

With Internet Service Providers (ISPs), Application Service Providers (ASPs) and centralized Internet and Enterprise Data Centers (IDCs), or Network Operation Centers (NOCs), the end user is provided with up-to-date hardware and software resources and applications. The centers can also provide resource redundancy and "always on" capabilities because of the economies of scale in operating a multi-user data center.

Thus, with the desire to return to time and resource sharing among enterprises (or organizations), in the form of IDCs and NOCs, there is a need to optimize the center's resources while maintaining a state-of-the-art facility for the users. There is also a need to provide security and integrity of individual enterprise data and ensure that data of more than one enterprise, or customer, are not co-mingled. In a typical enterprise, there may be significant downtime of the network while resources are upgraded or replaced due to failure or obsolescence. These shared facilities must be available 24-7 (i.e., around the clock) and yet, also be maintained with state-of-the art hardware and software.

An attribute of a data center environment is that the computing resources are most often "replaceable units" that can be easily substituted for each other. Units that have "strayed" in their configuration from the standard baseline often represent a problem.

SUMMARY

According to an embodiment of the present invention, a Utility Data Center (UDC) has a network of resources with one or more virtual networks within it. Any given resource may be used by an enterprise customer as if the resource were located on a physical local area network (LAN) separable from other UDC resources. Resources and message traffic within an enterprise are controlled by a control plane layer. Each control plane can control multiple VLANs, or enterprises.

In one embodiment, configuration information relating to the individual enterprises within the UDC is used to compare an enterprise with a baseline enterprise model. A configuration model for a given type of enterprise is developed with desired and potentially optimal hardware and software components. The configuration model is comprised of relevant information about hardware, firmware, operating system (OS), applications, etc., that is necessary to determine differences between enterprises. The baseline is compared to the actual enterprise configuration to determine differences. This comparison results in a set of recommendations for modifying the enterprise, for instance, by installing software patches or upgrading hardware components.

DESCRIPTION OF THE DRAWINGS

The detailed description will refer to the following drawings, wherein like numerals refer to like elements, and wherein.

DETAILED DESCRIPTION

Figure 1:
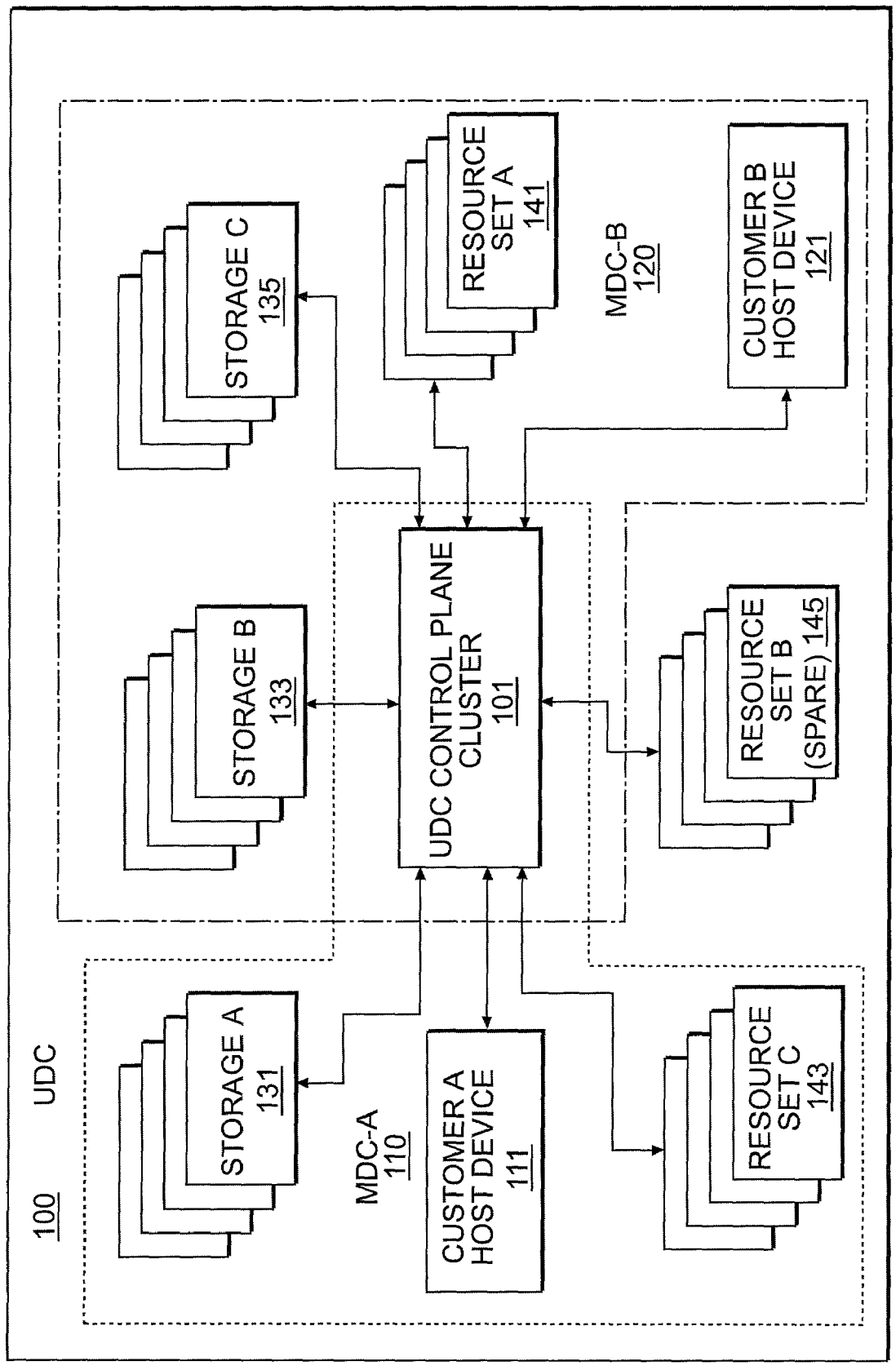
FIG. 1 is a block diagram showing an embodiment of a Utility Data Center (UDC) with virtual local area networks (VLANs)

The numerous innovative teachings of the present application will be described with particular reference to the presently described embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In one embodiment, configuration information relating to the individual enterprises within a UDC is used to compare an enterprise with a baseline enterprise model. A configuration model for a given type of enterprise is developed with desired and potentially optimal hardware and software components. The configuration model is comprised of relevant information about hardware, firmware, operating system (OS), applications, etc., that is necessary to determine differences between enterprises. The baseline is compared to the actual enterprise configuration to determine differences. This comparison results in a set of recommendations for modifying the enterprise, for instance, by installing software patches or upgrading hardware components.

In another embodiment, configurations for like enterprises are compared. For instance, enterprises for e-business sites may be similar in some aspects and would be considered a "like" enterprise. Types of enterprises could be for SAP deployment centers or web site servers, etc. The enterprise configuration data is compared to support deployments of preloaded mini-data centers (MDC). Mid-customers or buyers of a UDC may want to sell prepackaged MDCs to their end-customers. The MDC enterprise-to-enterprise (E2E) functionality gives the mid-customer the ability to monitor drift of deployed packaged MDCs. Additionally, basic maintenance can be performed on the MDC images.

High availability observatory (HAO) type snapshots of servers in terms of hardware, firmware, software configuration and patch levels are saved, typically in a nightly image. Collections of deployed packaged MDCs are then compared against a base model. Additionally, as new patches and/or updates become available, the deployed MDCs and the configuration models are analyzed to determine whether or not an upgrade notification should be sent.

An embodiment of the present invention combines existing support tools/agents with AOII (Always On Internet Infrastructure) technology in a Utility Data Center (UDC) to recognize and deploy message/data traffic through to virtual customer enterprises. The AOII technology uses a control plane, or communication and control layer, to control resources and message/data traffic among the UDC resources. The control plane manages the VLANs that comprise a set of mini-data centers (MDCs), or customer enterprises. These capabilities are leveraged to deploy prepackaged and/or customized support tools to an end-customer. This presents a clear business advantage in terms of cost reduction of support. End-customers no longer need to install and maintain support tools. This can be accomplished via the mid-customer. Additionally, maintenance of the support toolset can be done by the mid-customer providing economy of scale.

An advantage of an "always-on" infrastructure is hardware and software redundancy. If a component fails, the AOII will automatically switch out the failed component with a redundant unit. The AOII keeps track of which applications are configured on which hardware, and which ones are active. The network is monitored constantly for status. An example of a current system which will monitor an enterprise and assist in swapping out failed components is MC/ServiceGuard, available from Hewlett-Packard Company. AOII systems in the prior art are specific to an enterprise. Thus, each enterprise had to be monitored and maintained separately. An embodiment of the present invention promotes optimal resource use by creating virtual LANs (VLANS) within the UDC (or control plane) network.

Referring now to the drawings, and in particular to FIG. 1, there is shown a simplified embodiment of a UDC 100 with two VLANs, or mini-data centers (MDCs) 110 and 120. MDC-A 110 comprises a host device 111; resources 143; and storage 131. MDC-B 120 comprises a host device 121; resources 141; and storage 133 and 135. A UDC control plane manager 101 controls the virtual MDC networks. Spare resources 145 are controlled by the control plane manager 101 and assigned to VLANs, as necessary. A UDC control plane manager 101 may comprise a control plane database, backup management server, tape library, disk array, network storage, power management appliance, terminal server, SCSI gateway, and other hardware components, as necessary. The entire UDC network here is shown as an Ethernet hub network with the control plane manager in the center, controlling all other enterprise devices. It will be apparent to one skilled in the art that other network configurations may be used, for instance a daisy chain configuration.

In this embodiment, one control plane manager 101 controls MDC-A 110 and MDC-B 120. In systems of the prior art, MDC-A and MDC-B would be separate enterprise networks with separate communication lines and mutually exclusive storage and resource devices. In the embodiment of FIG. 1, the control plane manager 101 controls communication between the MDC-A 110 and MDC-B 120 enterprises and their respective peripheral devices. This is accomplished using VLAN tags in the message traffic. A UDC may have more than one control plane controlling many different VLANs, or enterprises. The UDC is monitored and controlled at a higher level by the network operation center (NOC)(not shown).

Figure 2:
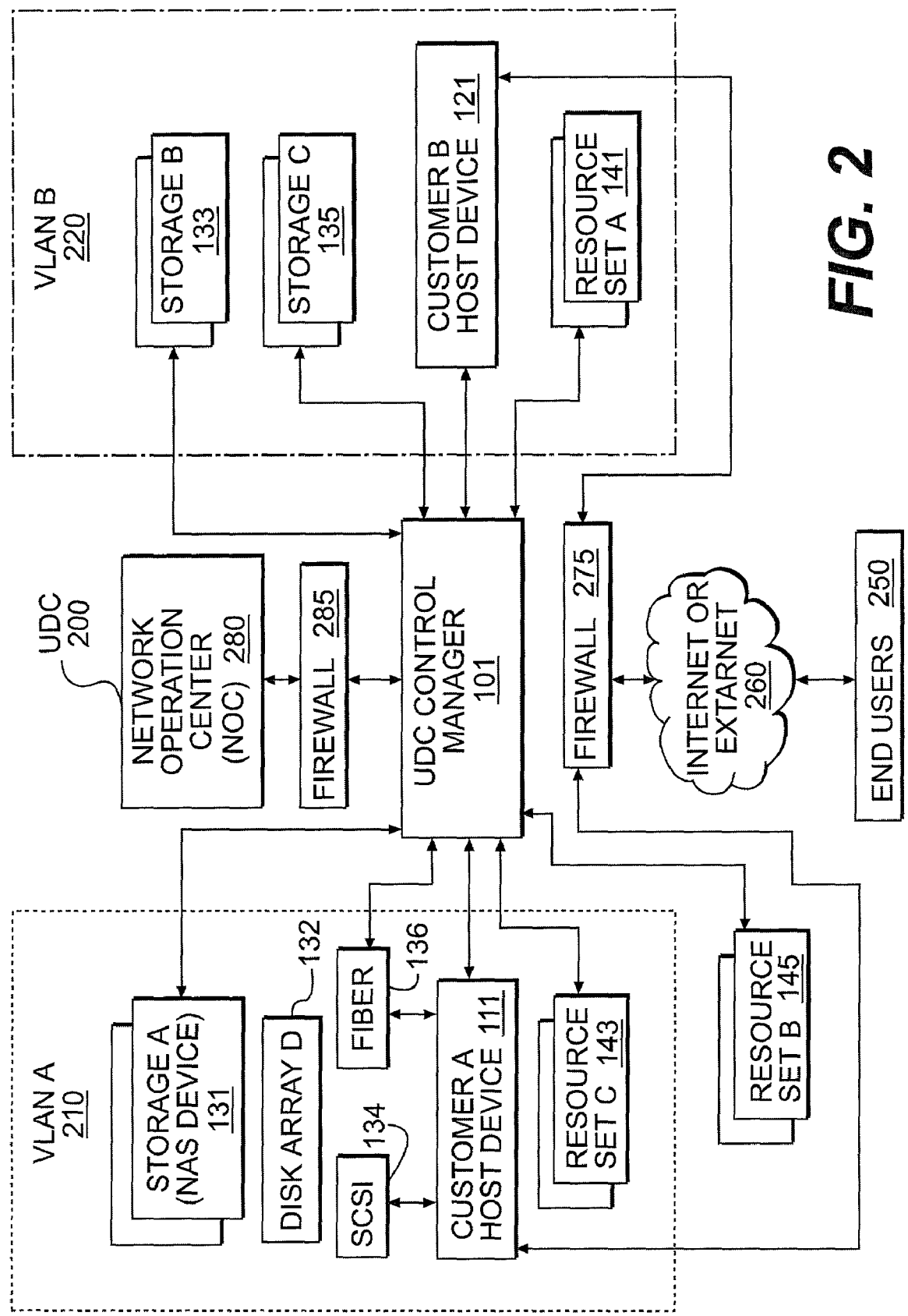
FIG. 2 is a hierarchical block diagram representing the two VLAN configurations within a UDC, as shown in FIG. 1.

Referring now to FIG. 2, there is shown an alternate hierarchical representation 200 of the two virtual networks (VLANs) in a UDC, as depicted in FIG. 1. VLAN A 210 is a hierarchical representation of the virtual network comprising MDC-A 110. VLAN B 220 is a hierarchical representation of the virtual network comprising MDC-B 120. The control plane manager 101 controls message traffic between the MDC host device(s) (111 and 121), their peripheral devices/resources (131, 132, 143, 133, 135 and 141). An optional fiber of SCSI (small computer system interface) network 134, 136 may be used so that the VLAN can connect directly to storage device 132. The fiber network is assigned to the VLAN by the control plane manager 101. The VLANs can communicate to an outside network, e.g., the Internet 260, directly through a firewall 275. It will be apparent to one skilled in the art that the enterprises could be connected to the end user 250 through an intranet, extranets or another communication network. Further, this connection may be wired or wireless, or a combination of both.

The control plane manager 101 recognizes the individual VLANs and captures information about the resources (systems, routers, storage, etc.) within the VLANs through a software implemented firewall. It monitors support information from the virtual enterprises (individual VLANs). The control plane manager also provides proxy support within the UDC control plane firewall 275 which can be utilized to relay information to and from the individual VLANs. It also supports a hierarchical representation of the virtual enterprise, as shown in FIG. 2. An advantage of a centralized control plane manager is that only one is needed for multiple VLANs. Prior art solutions required a physical support node for each virtual enterprise (customer) and required that support services be installed for each enterprise.

The network operation center (NOC) 280 is connected to the UDC control plane manager 101 via a firewall 285. The UDC control plane manager 101 communicates with the VLANs via a software implemented firewall architecture. In systems of the prior art, the NOC could not support either the control plane level or the VLAN level because it could not monitor or maintain network resources through the various firewalls. An advantage of the present invention is that the NOC 280 is able to communicate to the control plane and VLAN hierarchical levels of the UDC using the same holes, or trusted ports, that exist for other communications. Thus, an operator controlling the NOC 280 can install, maintain and reconfigure UDC resources from a higher hierarchical level than previously possible. This benefit results in both cost and timesavings because multiple control planes and VLANs can be maintained simultaneously.

Figure 3:
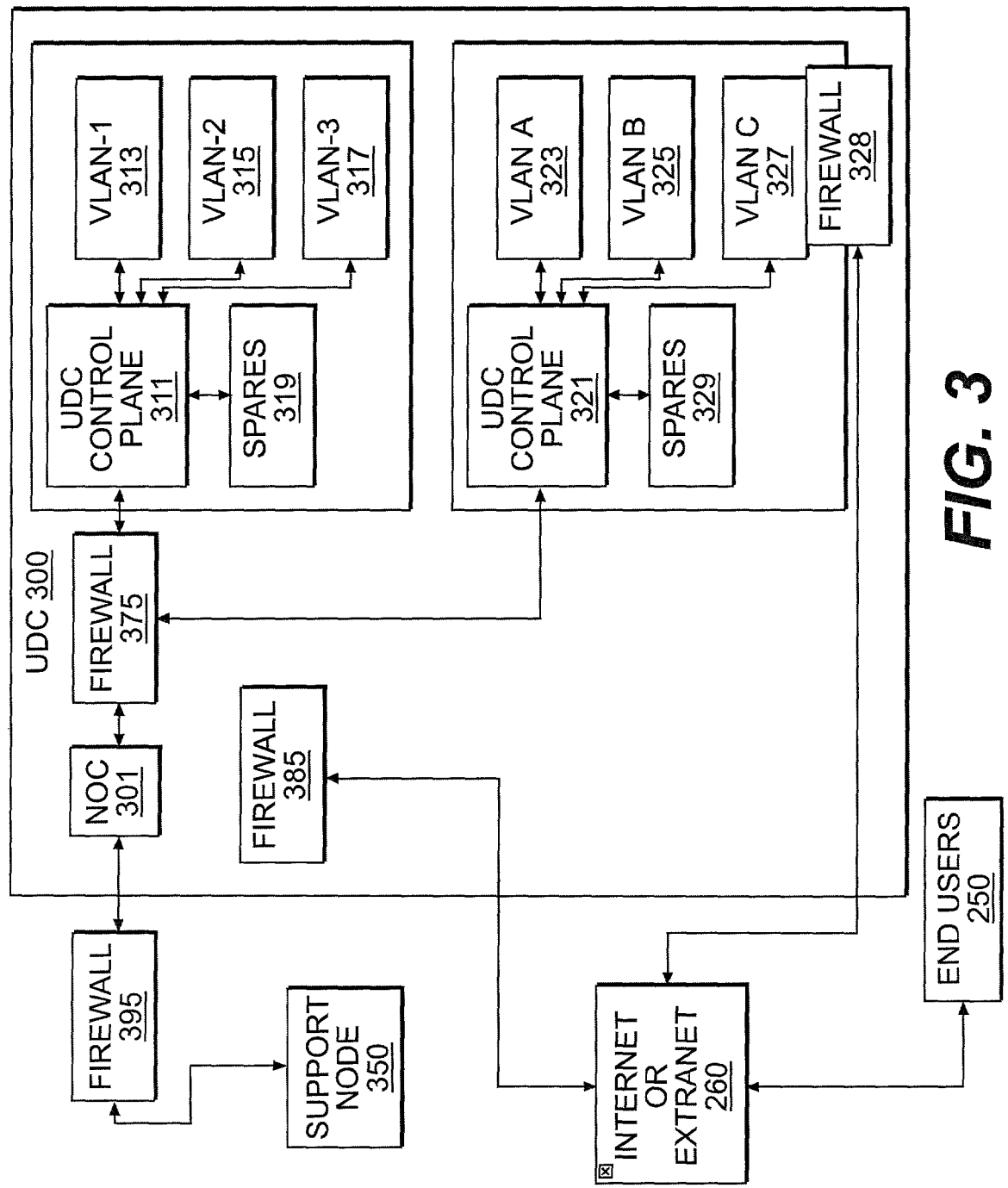
FIG. 3 is a block diagram of an embodiment of a UDC with multiple control planes with oversight by a NOC, and supported by an outside entity.

Referring now to FIG. 3, there is shown a simplified UDC 300 with multiple control plane managers 311 and 321 controlling several VLANs 313, 315, 317, 323, 325, and 327. In addition, the control planes control spare resources 319 and 329. A higher level monitoring system, also known as a network operation center (NOC) 301, is connected to the control planes 311 and 321 via a firewall 375. A VLAN can be connected to an outside network through a firewall as shown at VLAN C 327 and firewall 328. The NOC 301 has access to information about each VLAN 313, 315, 317, 323, 325 and 327 via a virtual protocol network (VPN). Typically, a human operator will operate the NOC and monitor the entire UDC. The operator may request that a control plane 311 reconfigure its virtual network based on performance analysis, or cost benefit analysis.

For example, if a resource dedicated to VLAN-1 (313) fails, the control plane 311 will automatically switch operation to a redundant resource. Because the network uses an always-on infrastructure, it is desirable to configure a spare from the set of spares 319 to replace the faulty resource, as a new redundant dedicated resource. In systems of the prior art, this enterprise would be monitored and maintained separately. In this embodiment, the NOC 301 monitors the control planes 311 and 321, as well as, the VLANs 313, 315, 317, 323, 325 and 327. Thus, if none of the spares 319 are viable substitutions for the failed component, the NOC operator can enable one of the spares 329 to be used for control plane 311 rather than control plane 321. Depending on the physical configuration of the UDC, this substitution may require a small update in the VLAN configurations of each VLAN, or may require a cable change and then a VLAN configuration change.

Because one centralized control system (NOC 301) is used to monitor and route traffic among several VLANs a high availability observatory (HAO) facility can monitor the entire UDC at once. Systems of the prior art use HAO's at an enterprise level, but the HAO could not penetrate between the network hierarchies from a control plane level to the enterprise level. The present system and method has the advantage that problems with components of any enterprise, or VLAN, within the UDC can be predicted and redundant units within the UDC can be swapped and repaired, even between and among different control planes and VLANs, as necessary. The HAO facility would predict problems, while a facility such as MC/ServiceGuard, available from Hewlett-Packard Company, would facility the swapping of redundant units. If an enterprise is not required to be "always-on" it can operate without redundant units. However, during planned and unplanned system maintenance, the system, or portions of the system may be unavailable. Maintenance and support costs will be favorably affected by the use of the NOC regardless of the always-on capabilities of the individual enterprises.

In an embodiment, the HAO performs two (2) tasks. First, once each day, a remote shell, or execution, (remsh) is launched out to each client/component in the UDC that has been selected for monitoring. The remsh gathers many dozens of configuration settings, or items, and stores the information in a database. Examples of configuration items are: installed software and version, installed patches or service packs, work configuration files, operating configuration files, firmware versions, hardware attached to the system, etc. Analysis can then be performed on the configuration data to determine correctness of the configuration, detect changes in the configuration from a known baseline, etc. Further, a hierarchy of the UDC can be ascertained from the configuration data to produce a hierarchical representation such as shown in FIG. 2. Second, a monitoring component is installed on each selected component in the UDC. The monitoring components send a notification whenever there is a hardware problem. For instance, a memory unit may be experiencing faults, or a power supply may be fluctuating and appear to be near failure. In this way, an operator at the NOC 301 level or support node 350 level can prevent or mitigate imminent or existing failures. It will be apparent to one skilled in the art that a monitoring component can be deployed to measure any number of metrics, such as performance, integrity, throughput, etc.

This monitoring and predictive facility may be combined with a system such as MC/ServiceGuard. In systems of the prior art, MC/ServiceGuard runs at the enterprise level. If a problem is detected on a primary system in an enterprise, a fail over process is typically performed to move all processes from the failed, or failing, component to a redundant component already configured on the enterprise. Thus, the HAO monitors the UDC and predicts necessary maintenance or potential configuration changes. If the changes are not made before a failure, the MC/ServiceGuard facility can ensure that any downtime is minimized. Some enterprise customers may choose not to implement redundant components within their enterprise. In this case, oversight of the enterprise at the NOC or support node level can serve to warn the customer that failures are imminent and initiate maintenance or upgrades before a debilitating failure.

In current systems, an NOC (301) could not monitor or penetrate through the firewall to the control plane cluster layer (311, 321), or to the enterprise layer (VLAN/MDC 313, 315, 317, 323, 325, 327). In contrast, the present system and method is able to deploy agents and monitoring components at any level within the UDC. Thus, the scope of service available with an HAO is expanded. The inherent holes in the communication mechanisms used to penetrate the firewalls are used.

The communication mechanism is XML (eXtended Markup Language) wrapped HTTP (hypertext transfer protocol) requests that are translated by the local agents into the original HAO support actions and returned to the originating support request mechanism. HTTP may be used for requests originating from outside the customer enterprise. SNMP (simple network management protocol) may be used as a mechanism for events originating within the customer enterprise. This and other "client originated events" can be wrapped into XML objects and transported via HTTP to the support node 350. In alternative embodiments, the support node 350 can be anywhere in the UDC, i.e. at the control plane level NOC level, or even external to the UDC, independent of firewalls.

The purpose of a firewall is to block any network traffic coming through. Firewalls can be programmed to let certain ports through. For instance, a firewall can be configured to allow traffic through port 8080. HTTP (hypertext transfer protocol) messages typically use port 8080. In systems of the prior art, an HAO is configured to communicate through many ports using remote execution and SNMP communication mechanisms. These mechanisms are blocked by the default hardware and VLAN firewalls. In the present system and method, a single port can be programmed to send HAO communications through to the control plane and enterprise layers. Fewer holes in the firewall are preferred, for ease of monitoring, and minimization of security risks.

Similar to the architecture of SOAP (Simple Object Access Protocol), a series of messages or requests can be defined to proxy support requests through firewalls. An example is a "configuration collection request." The collection request is encapsulated in an XML document sent via HTTP through the firewall to the local agent within the firewall. The local agent does the collection via remsh as is done in the existing HAO. The remsh is performed within a firewall and not blocked. The results of the request are packaged up in an XML reply object and sent back through the firewall to the originating requesting agent.

Referring again to FIG. 2, the control plane can provide proxy support within the UDC control plane firewall 285. For instance, 10-15 different ports might be needed to communicate through the firewall 275. It is desirable to reduce the number of ports, optimally to one. A proxy mechanism on each side reduces the number of required ports, while allowing this mechanism to remain transparent to the software developed using multiple ports. This enables each VLAN to use a different port, as far as the monitoring tools and control software is concerned. Thus, the existing tools do not need to be recoded to accommodate drilling a new hole through the firewall each time a new VLAN is deployed.

Another example is an event generated within a control plane. A local "event listener" can receive the event, translate it into an XML event object, and then send the XML object through the firewall via HTTP. The HTTP listener within the NOC can accept and translate the event back into an SNMP event currently used in the monitoring system.

An advantage of the UDC architecture is that a baseline system can be delivered to a customer as a turnkey system. The customer can then add control plane clusters and enterprises to the UDC to support enterprise customers, as desired. However, the UDC operator may require higher-level support from the UDC developer. In this case, a support node 350 communicates with the NOC 301 via a firewall 395 to provide support. The support node monitors and maintains resources within the UDC through holes in the firewalls, as discussed above. Thus, the present system and method enables a higher level of support to drill down their support to the control plane and VLAN levels to troubleshoot problems and provide recommendations. For instance, spare memory components 319 may exist in the control plane 311. The support node 350 may predict an imminent failure of a memory in a specific enterprise 313, based on an increased level of correction on data retrieval (metric collected by a monitoring agent). If this spare 319 is not configured as a redundant component in an enterprise, a system such as MC/ServiceGuard cannot swap it in. Instead, the support node 350 can deploy the changes in configuration through the firewalls, and direct the control plane cluster to reconfigure the spare memory in place of the memory that will imminently fail. This method of swapping in spares saves the enterprise customers from the expense of having to maintain additional hardware. The hardware is maintained at the UDC level, and only charged to the customer, as needed.

Figure 4:
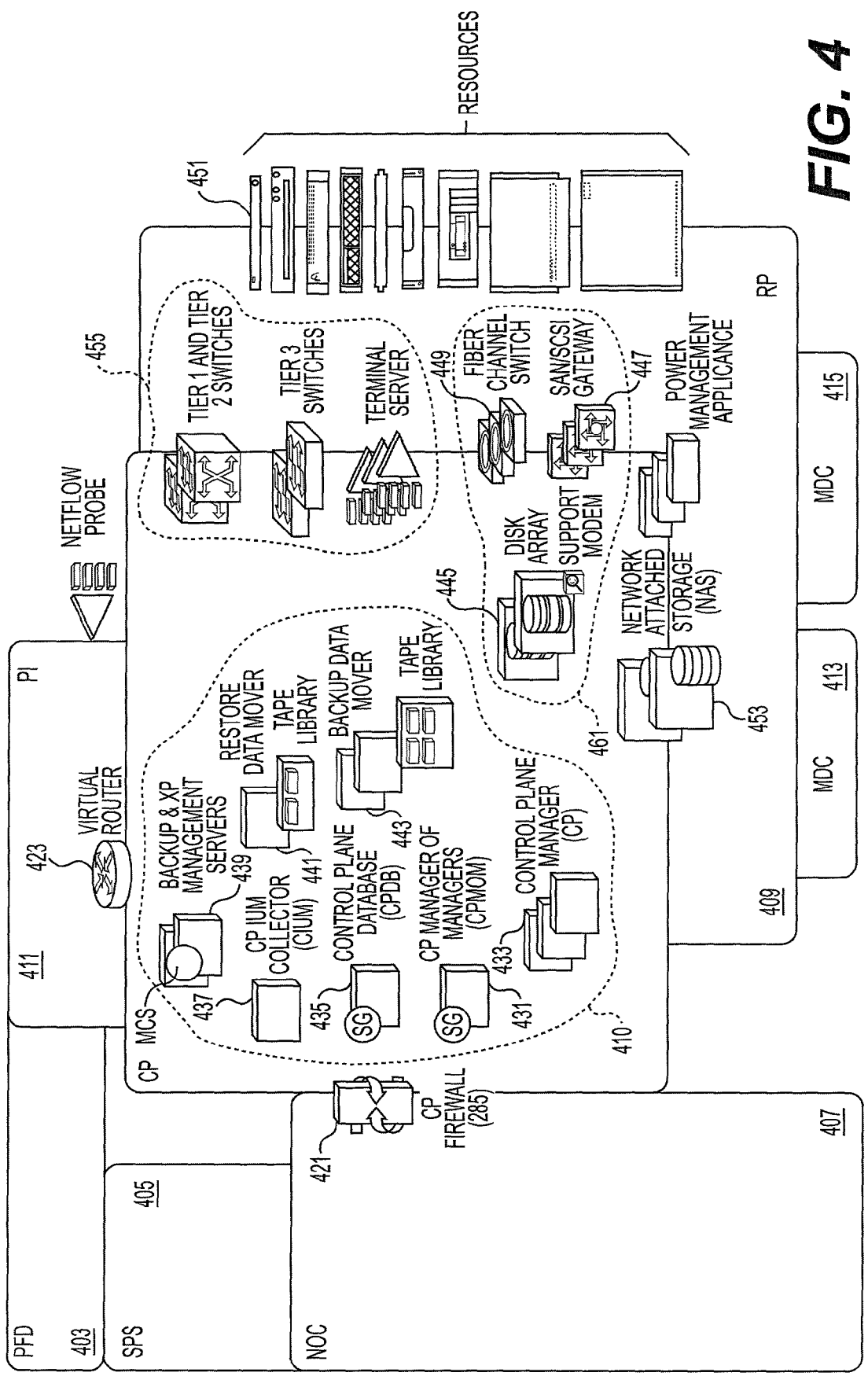
FIG. 4 is a block diagram of an embodiment of a control plane management system of a UDC.

Referring now to FIG. 4, there is shown a more detailed view of an embodiment of a control plane management system (410, comprising: 431, 433, 435, 437, 439, 441, and 443) (an alternative embodiment to the control plane manager of FIGS. 1, 2 and 3) within a UDC 400. Several components of the UDC are shown, but at different levels of detail. In this figure, adjacent components interface with one another. The control plane (CP) 401 is shown adjacent to the public facing DMZ (PFD) 403, secure portal segment (SPS) 405, network operation center (NOC) 407, resource plane (RP) 409 and the Public Internet (PI) 411. The various virtual LANs, or mini-data centers (MDC) 413 and 415 are shown adjacent to the resource plane 409 because their controlling resources, typically CPUs, are in the RP layer.

The control plane 401 encompasses all of the devices that administer or that control the VLANs and resources within the MDCs. In this embodiment, the CP 401 interacts with the other components of the UDC via a CP firewall 421 for communication with the NOC 407; a virtual router 423 for communicating with the PI 411; and a number of components 455 for interacting with the resource plane (RP) 409 and MDCs 413, 415. A control plane manager of managers (CPMOM) 431 controls a plurality of control plane managers 433 in the CP layer 401. A number of components are controlled by the CPMOM 431 or individual CP 433 to maintain the virtual networks, for instance, CP Database (CPDB) 435; Control Plane Internet Usage Metering (CP IUM) Collector (CPIUM) 437, using Netflow technology on routers to monitor paths of traffic; backup and XP management servers 439; restore data mover and tape library 441; and backup data mover and tape library 443. These devices are typically connected via Ethernet cables and together with the CPMOM 431 and CP manager 433 encompass the control plane management system (the control plane manager of FIGS. 1-3). There may be network attached storage (NAS) 453 which is allocated to a VLAN by the CP manager, and/or disk array storage 445 using either SCSI or fiber optic network connections and directly connected to the resources through fiber or SCSI connections. The disk array 445, fiber channel switches 449, and SAN/SCSI gateway 447 exist on their own fiber network 461. The resources 451 are typically CPU-type components and are assigned to the VLANs by the CP manager 433.

The CP manager 433 coordinates connecting the storage systems up to an actual host device in the resource plane 409. If a VLAN is to be created, the CP manager 433 allocates the resources from the RP 409 and talks to the other systems, for instance storing the configuration in the CPDB 435, etc. The CP manager 433 then sets up a disk array 445 to connect through a fiber channel switch 449, for example, that goes to a SAN/SCSI gateway 447 that connects up to resource device in the VLAN. Depending on the resource type and how much data is pushed back and forth, it will connect to its disk array via either a small computer system interface (SCSI), i.e., through this SCSI/SAN gateway, or through the fiber channel switch. The disk array is where a disk image for a backup is saved. The disk itself doesn't exist in the same realm as where the host resource is because it is not in a VLAN. It is actually on this SAN device 447 and controlled by the CP manager 433.

Things that are assigned to VLANs are things such as a firewall, that an infrastructure might be built, and a load balancer so that multiple systems can be hidden behind one IP address. A router could be added so that a company's private network could be added to this infrastructure. A storage system is actually assigned to a host device specifically. It is assigned to a customer, and the customer's equipment might be assigned to one of the VLANs, but the storage system itself does not reside on the VLAN. In one embodiment, there is storage that plugs into a network and that the host computer on a VLAN can access through Ethernet network. Typically, how the customer hosts are connected to the disk storage is through a different network, in one embodiment, through a fiber channel network 461. There is also a network attached storage (NAS) device 453, whereas the other storage device that connects up to the host is considered a fiber channel network storage device. The NAS storage device 453 connects through an Ethernet network and appears as an IP address on which a host can then mount a volume. All of the delivery of data is through Ethernet to that device.

The control plane manager system 410 has one physical connection for connecting to multiples of these virtual networks. There is a firewall function on the system 410 that protects VLAN A, in this case, and VLAN B from seeing each others data even though the CP manager 433 administers both of these VLANs.

Figure 5:
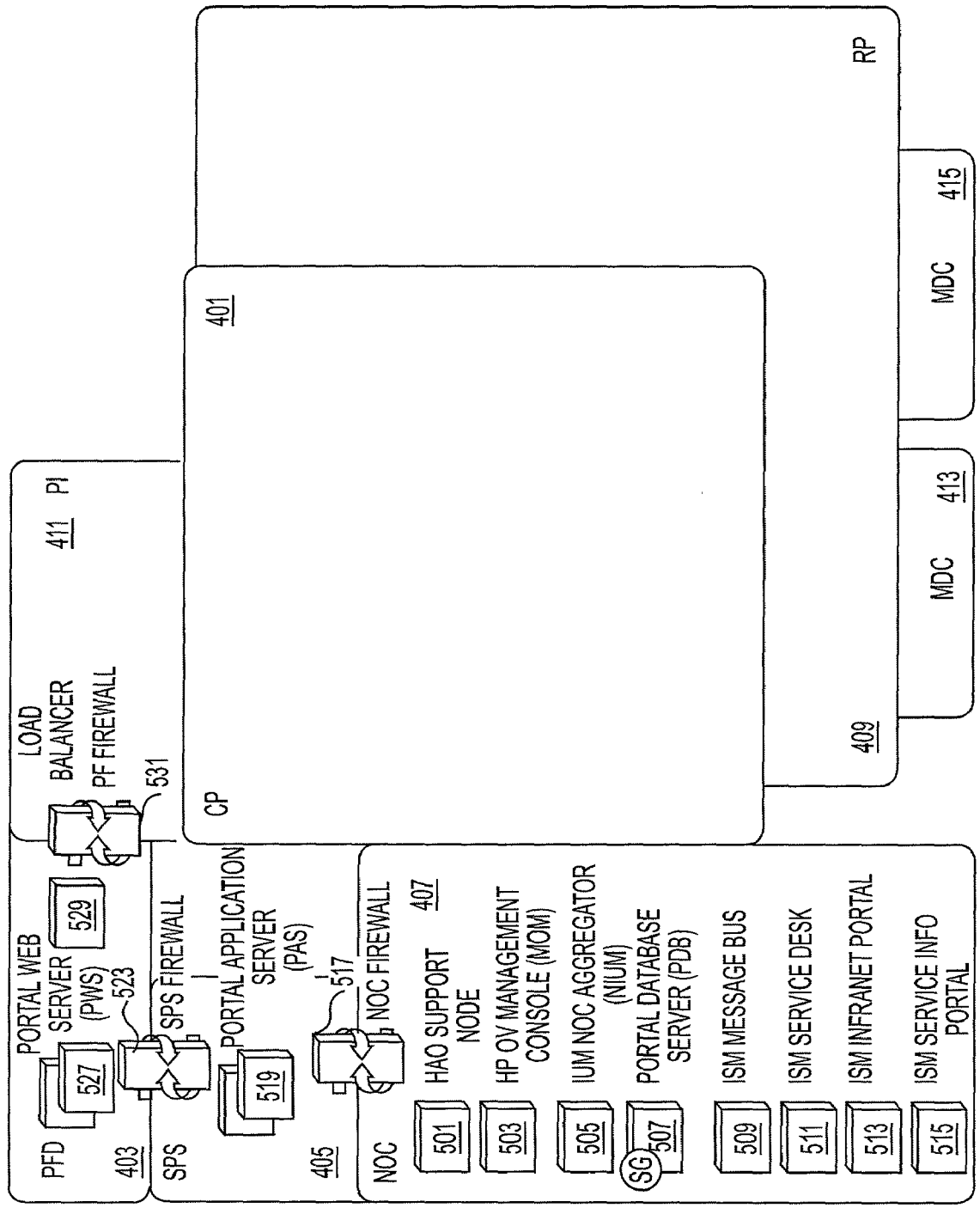
FIG. 5 is a block diagram of an embodiment of a management portal segment layer of a UDC.

Referring now to FIG. 5, there is shown a more detailed view of the NOC layer of the UDC 400. The NOC 407 is connected to the CP 401 via firewall 421 (FIG. 4). In an exemplary embodiment within the NOC 407 is a HAO support node 501, HP OpenView (OV) Management Console 503 (a network product available from Hewlett-Packard Company for use in monitoring and collecting information within the data center), IUM NOC Aggregator (NIUM) 505, portal database server (PDB) 507, ISM message bus 509, ISM service desk 511, ISM intranet portal 513, and ISM service info portal 515. The NOC 407 interfaces with the secure portal segment (SPS) 405 via a NOC firewall 517. The SPS 405 has a portal application server (PAS) 519. The SPS 405 interfaces with the public facing DMZ (PFD) 403 via a SPS firewall 523. These two firewalls 517 and 523 make up a dual bastion firewall environment. The PFD 403 has a portal web server (PWS) 527 and a load balancer 529. The PFD 503 connects to the PI 411 via a PF firewall 531.

The PFD 403, SPS 405 and NOC layer 407 can support multiple CP layers 401. The control planes must scale as the number of resources in the resource plane 409 and MDCs 413 and 415 increase. As more MDCs are required, and more resources are utilized, more control planes are needed. In systems of the prior art, additional control planes would mean additional support and controlling nodes. In the present embodiment, the multiple control planes can be managed by one NOC layer, thereby reducing maintenance costs considerably.

Figure 6:
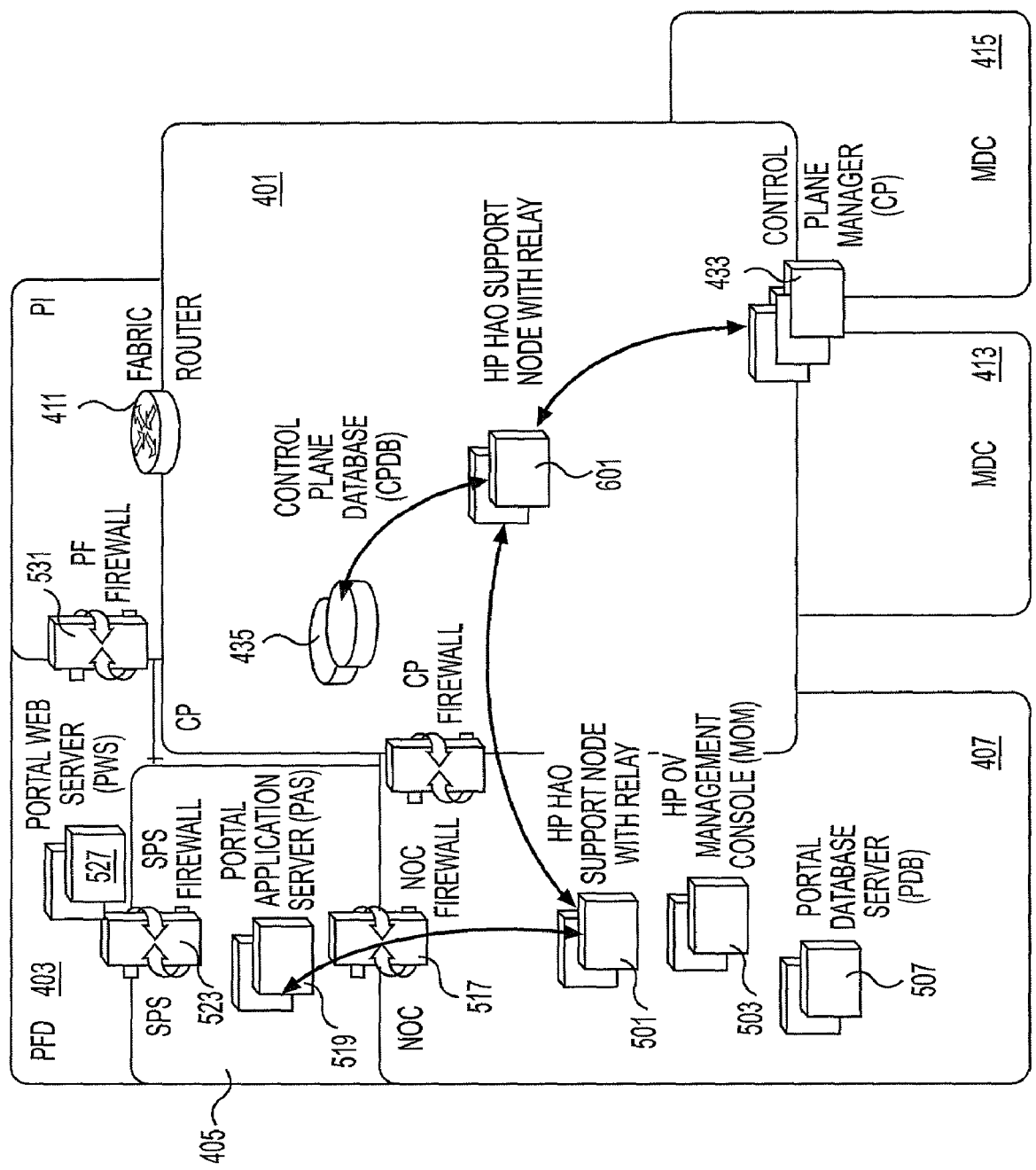
FIG. 6 is a block diagram of an embodiment of a high availability observatory (HAO) support model of a UDC.

Referring now to FIG. 6, there is shown an exemplary management structure for a high availability observatory (HAO) support model. The HP HAO support node with relay 601 has access to the control plane database (CPDB) 435 to pull inventory and configuration information, as described above for a simple UDC. The HP HAO support node 601 residing in the control plane consolidates and forwards to the NOC for the UDC consolidation. In an embodiment, a support node (SN) resides at the NOC level 501 and/or at an external level 350 (FIG. 3). The support node 601 is a virtual support node (VSN), or proxy, that listens for commands from SN 501 and performs actions on its behalf and relays the output back to SN 501 for storage or action. Each CP manager system can run multiple VSN instances to accommodate multiple VLANs, or MDCs, that it manages. The CP manager system 433 then consolidates and relays to a consolidator in the CP. The NOC support node 501 consolidates multiple CPs and provides the delivery through the Internet Infrastructure Manager (IIM) portal, also known as UDC Utility Data Center Utility Controller (UC) management software, for client access. This method can scale up or down depending on the hierarchy of the data center. For instance, a support node 350 (FIG. 3) may interact with a VSN at the NOC level in order to monitor and support the NOC level of the UDC. It may also interact with VSNs at the CP level in order to monitor and support the CP level of the UDC.

The control plane management system has one physical connection that connects to multiples of these virtual networks. There is a firewall function on the CP management system that protects VLAN A, in the exemplary embodiment, for instance, and VLAN B from seeing each other's data even though the control plane management system is administrating both of these VLANs. The VLANs themselves are considered an isolated network.

Information still needs to be communicated back through the firewall, but the information is gathered from multiple networks. The VLAN tagging piece of that gathering is the means by which this data is communicated. In the typical network environment of the prior art, there are multiple network interfaces. Thus, a system would have to have multiple cards in it for every network that it is connecting to. In the present system, the CP management system only has one connection and uses this communication gateway to see all of the networks (VLANs) and transfer information for these VLANs up to the support node by using VLAN tagging in the card.

Information can be sent back and forth from the CP management system to the VLANs, but by virtue of the protocol of the gateway, information cannot be sent from one VLAN to the other. Thus, the information remains secure. This gateway is also known as a VLAN tag card. This type of card is currently being made by 3COM and other manufacturers. The present system differs from the prior art because it securely monitors all of the HAO through this one card.

Figure 7:
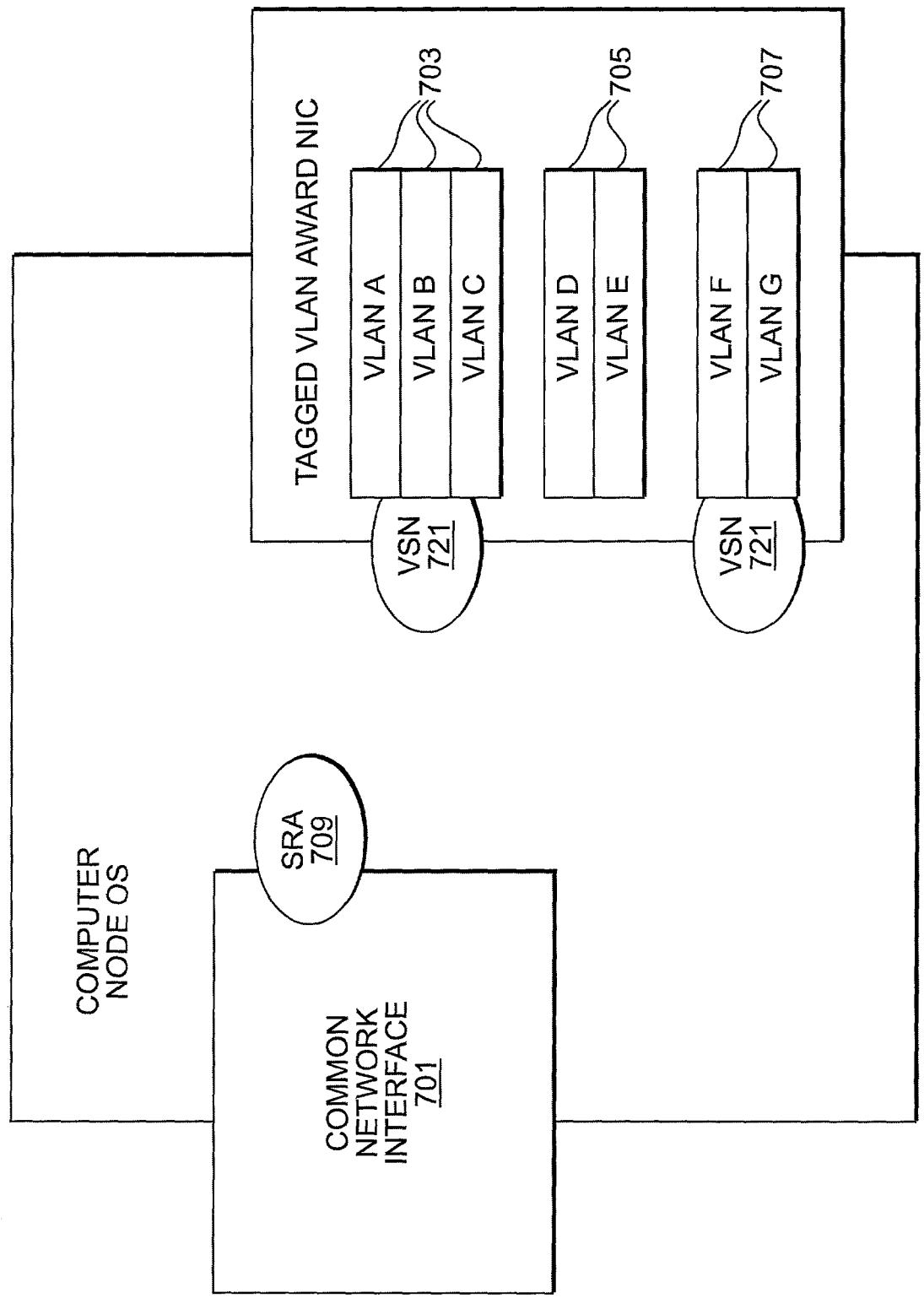
FIG. 7 is a block diagram of a virtual support node (VSN) and VLAN tagging system used to segregate the VLANs of a UDC.

Referring now to FIG. 7, there is shown the common network interface card and its interaction with the VLANs. The CP management system sees all of the resource VLANs; it has a common network interface card 701 with a firewall piece (not shown). A gateway is created with the HAO that allows it to perform the HAO support functions. The virtual support nodes (VSN) 721 connect to all of these different VLANs 703, 705, 707 through one interface. The support relay agent (SRA) 709 communicates all of the secure information through the common network interface 701. The SRA 709 is used to translate support requests specific to the virtual support nodes into "firewall save" communications. For example, HTTP requests can be made through the firewall where they get proxied to the actual support tools. The existing art of "SOAP" (Simple Object Access Protocol) is a good working example as to how this would work. This is predicated on the currently acceptable practice of allowing holes in firewalls for HTTP traffic. The virtual support node uses the industry standard and accepted protocol of HTTP to drill through the firewalls. Utilizing a SOAP type mechanism, collection requests and client-originated events are wrapped in XML objects and passed through the firewall between "HAO Proxies."

Figure 8:
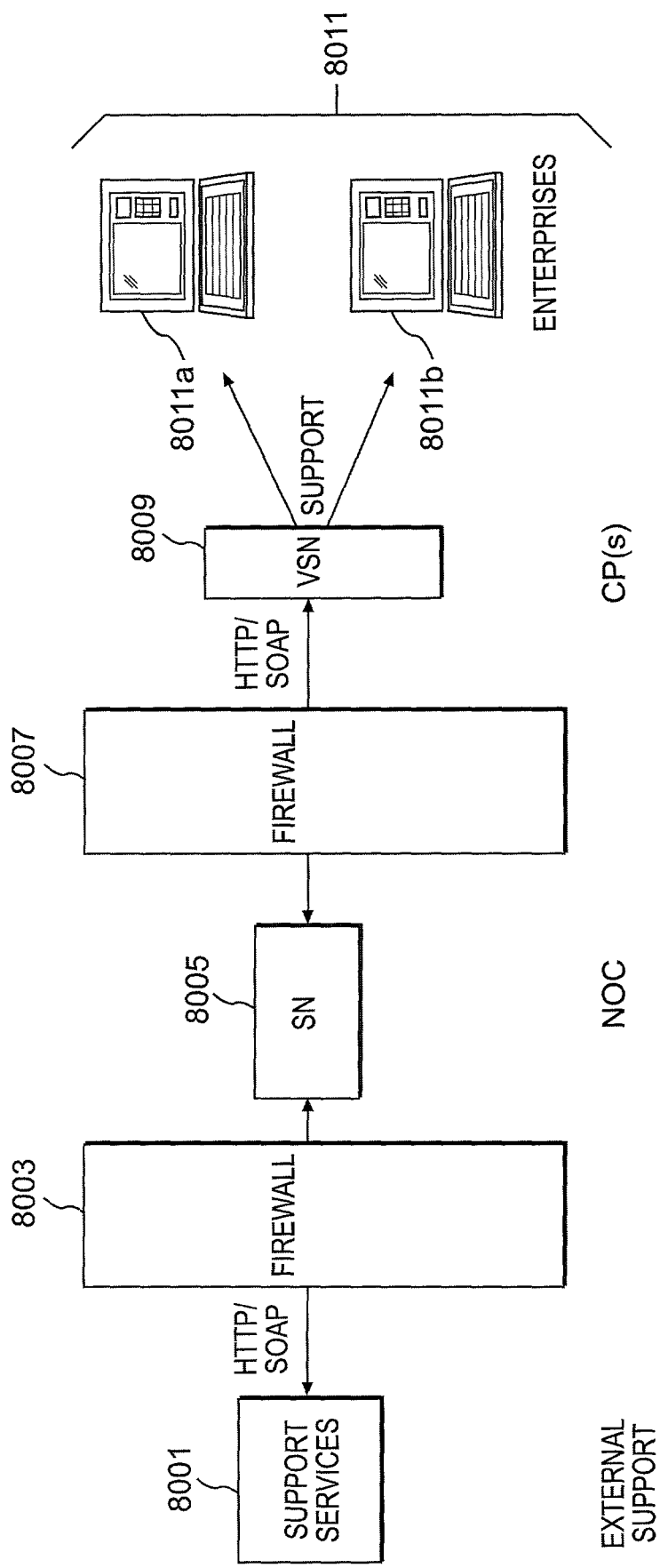
FIG. 8 is a block diagram of support services through firewalls as relates to a UDC.

Referring now to FIG. 8, there is shown a block diagram of support services through firewalls as relates to a data center. Standard support services 8001 such as event monitoring and configuration gathering can be accomplished remotely in spite of the existence of firewalls 8003 and 8007 by using HTTP based requests. By leveraging technologies such as Simple Object Access Protocol (SOAP), the Support Node (SN) 8005 can package up requests such as a collection command in an XML object. The Request can be sent to a "Support Proxy," or virtual support node (VSN) 8009 on the other side of the firewall 8007. A VSN 8009 on the other side of the firewall 8007 can translate that request into a collection command, or any other existing support request, that is run locally as though the firewall 8007 was never there.

For example, a request to gather the contents of the '/etc/networkrc' file from enterprise 8011*a* in a control plane might be desired. There is a SN 8005 in the NOC and a VSN 8009 inside the Control plane. The request for /etc/networkrc is made from the SN 8005. The request is packaged as an XML SOAP object. The request is sent to the VSN 8009 inside the CP, and through the CP's firewall (not shown). The VSN 8009 hears the HTTP based SOAP request and translates it into a remote call to get the requested file from the enterprise 8011*a*. The VSN 8009 packages up the contents of the requested file into another XML SOAP object and sends it back to the SN 8005.

Figure 9:
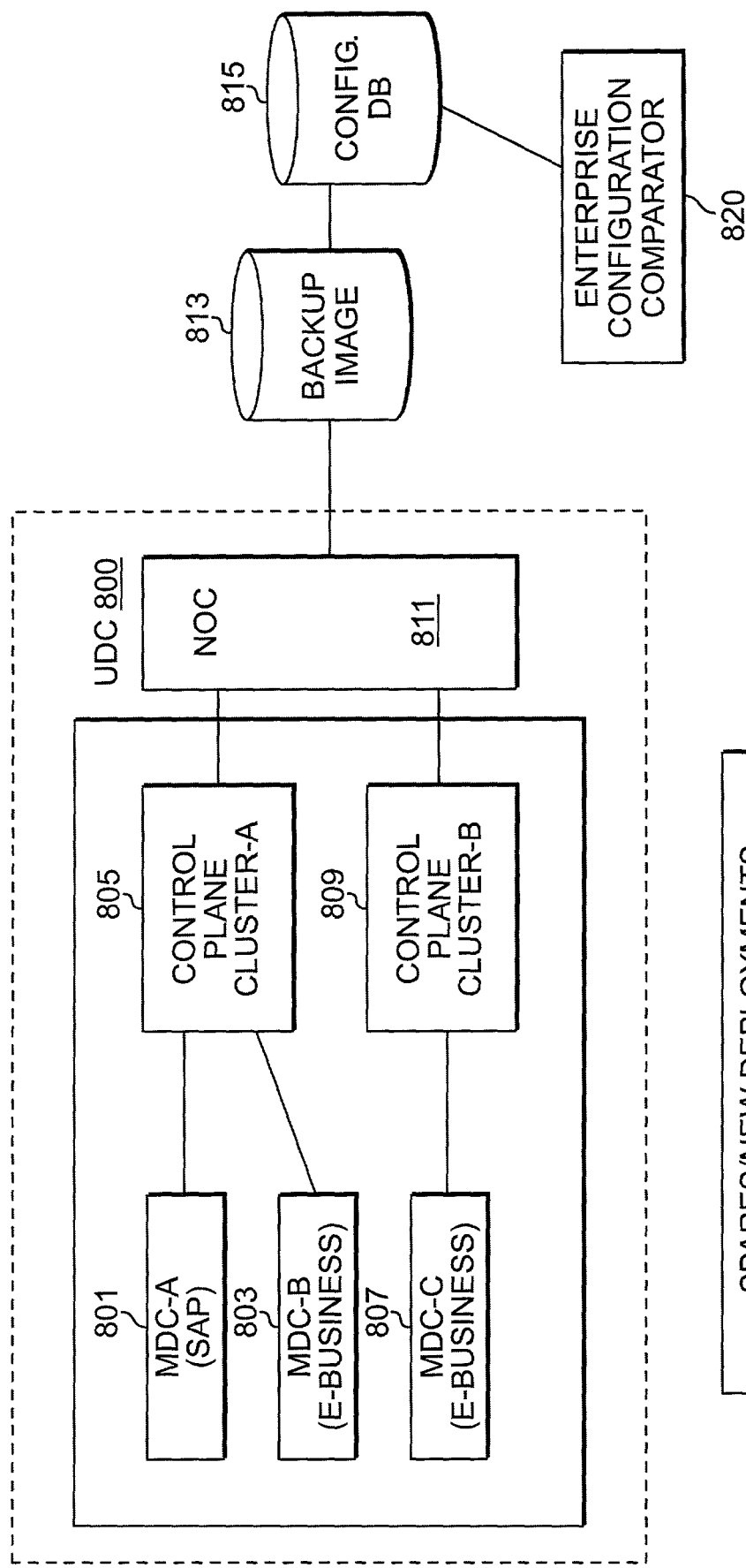
FIG. 9 is a block diagram of an embodiment of a system for enterprise comparison.

Referring now to FIG. 9, there is shown a block diagram of an exemplary UDC and an enterprise configuration comparator. In this exemplary embodiment, the UDC 800 comprises three MDCs: MDC-A 801, MDC-B 803, MDC-C 807. MDC-A and MDC-B are controlled by the UDC control plane cluster-A 805. MDC-A 801 is an enterprise running a SAP deployment center, whereas MDC-B 803 is an enterprise running an e-business. MDC-C 807 is an enterprise running an e-business. Control plane cluster-A 805 and control plane cluster-B 809 are connected to the network operation center (NOC) 811 which monitors and has some oversight control of the UDC 800. The NOC 811 will take the configuration information from each of the components in the UDC and store it in a configuration database 815. In a typical embodiment, a nightly backup image 813 is made and the configuration data is stored in the database 815 from the backup image. This has the advantage that resources of the enterprises are not used during analysis of the configuration. The enterprise configuration comparator 820 takes information from the configuration database 815 and runs the appropriate analysis.

The comparisons between enterprises, or between an enterprise and a preferred enterprise model, are made using standard and existing tools such as the Unix diff command. The art of the science is in the creation of "smart diffs" or filters. Certain configuration differences are not only expected, they are necessary. When comparing two different devices, even if they are from the same "ignite," or baseline, image, they have necessary differences such as IP address and hostname. Additionally, there are irrelevant differences such as date strings. The configuration comparison is accomplished by diff'ing each configuration file and/or configuration tool's output for each of the two systems. The output is then masked or filtered to hide "expected" configuration differences as described above.

MDC-D 831 is a planned deployment for a SAP enterprise. MDC-E 833 is a planned deployment for an e-business enterprise. It is desirable to deploy the new MDCs 831 and 833 using optimal or standard configurations for the enterprise type. Standard configurations can be deployed by comparing the existing enterprise, or MDC, configuration to a known or preferred standard configuration, making appropriate modifications to the existing configuration to make it conform to the standard.

Figure 10:
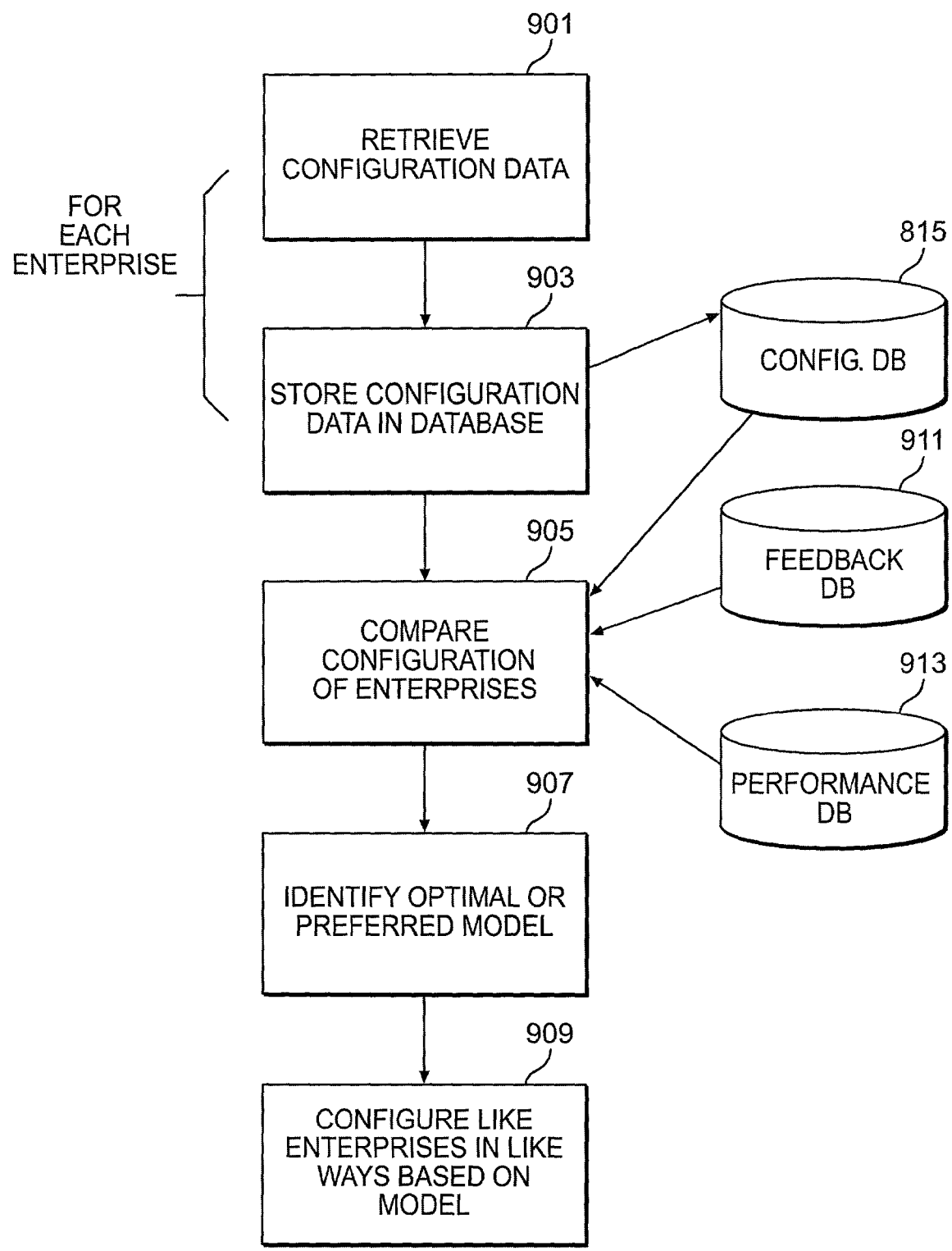
FIG. 10 is a flow diagram illustrating a method for comparing a plurality of enterprise configurations in an embodiment of the invention.

Referring now to FIG. 10, there is shown a flow chart illustrating a method for comparing configurations of two or more enterprises. The configuration data is retrieved from either the backup image or, in some embodiments, directly from the enterprise components, in step 901. The configuration data is then stored in the configuration database 815, in step 903. The comparison of enterprise configurations, in step 905, utilizes data from the configuration database 815 and in some embodiments, from a feedback database 911 and/or performance database 913. A feedback database contains information regarding user feedback related to a specific enterprise. For instance, if users feel that the performance is slow, that feedback would be stored in a database so that the operator would be aware that this is not an optimal configuration for an enterprise of this type. The performance database holds information relating to throughput, resource usage, etc., which basically gives an objective measure of the actual enterprise.

In one embodiment, the target enterprise is compared with other like and known good enterprises, using configuration information and feedback and performance data. Based on the comparison of two or more enterprises, an optimal, or preferred, enterprise model is identified in step 907. In other embodiments, this model is selected from a known good model (KGM) and a straight diff is performed comparing the target enterprise and the known good enterprise, using the configuration database 815. Based on the diff, it is determined what changes are required for the target enterprise to bring it to the standard level of the known good enterprise. Based on the provided known good enterprise, or the identified optimal model, like enterprises will be configured similarly to the preferred enterprise model in step 909. For example, if it is determined that the preferred model enterprise for the e-business type has a specific version of conversation software running and the actual enterprise in a UDC is using a previous version, a recommendation will be made for an upgrade to the newer version of that software. A customer (enterprise owner) can register a KGM configuration and register with the system that a notification be made that a detected configuration change is different than the registered KGM. In some embodiments, these upgrades will occur automatically.

Figure 11:
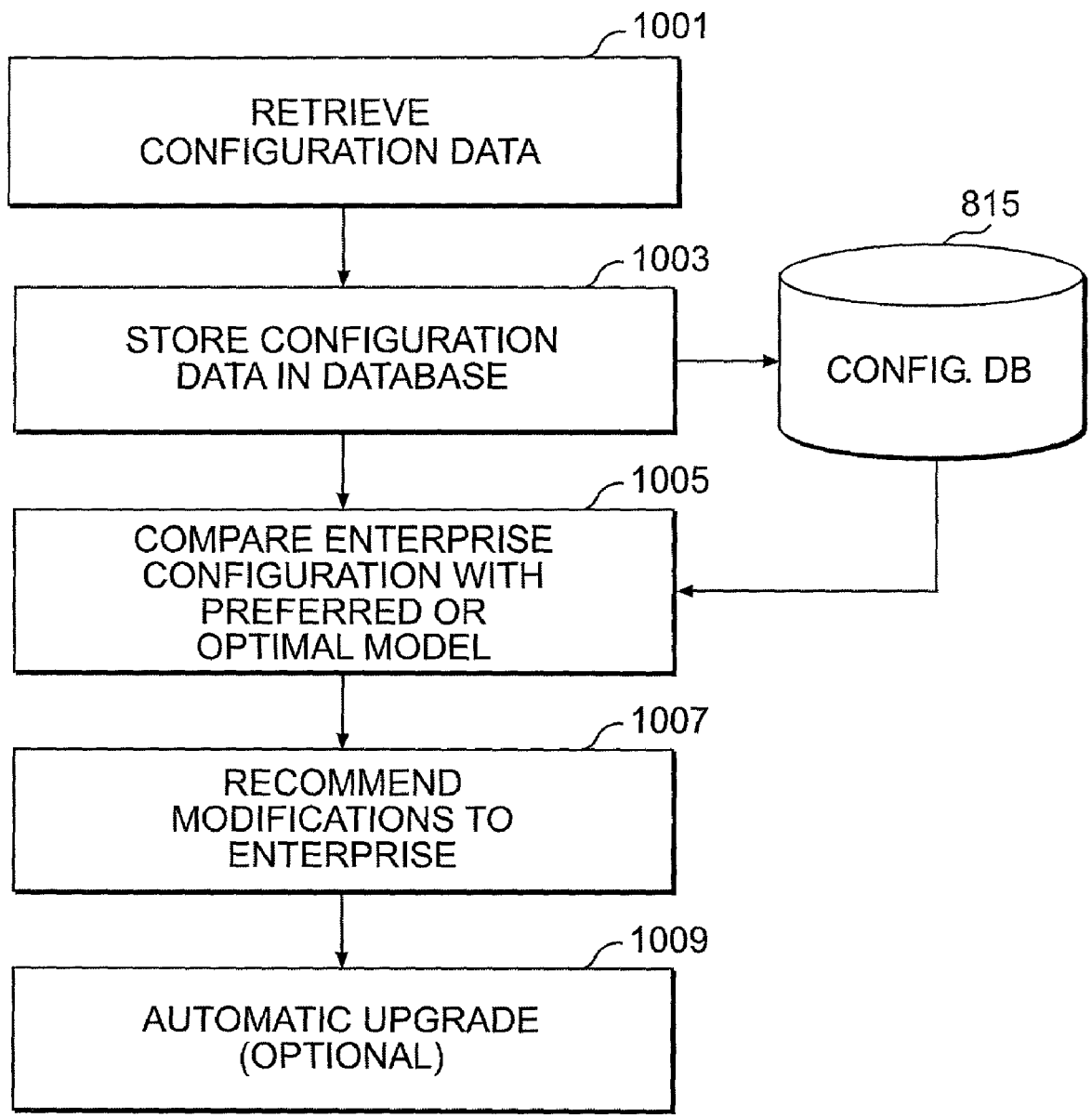
FIG. 11 is a flow diagram illustrating a method for comparing an enterprise with an enterprise model in an embodiment of the invention.

Referring now to FIG. 11, there is shown a flow chart illustrating the comparison of an enterprise with a preferred model enterprise for that specific type. The configuration data is retrieved in step 1001, typically from a backup image of the enterprise. The configuration data is stored in the configuration database 815, in step 1003. In this embodiment, a preferred model, or KGM, configuration has already been determined for the enterprise of this type and is compared with the actual configuration of the enterprise, in step 1005. This comparison yields a recommendation for modifications to the enterprise based on the differences between it and the preferred (or KGM) in block 1007. These modifications could be hardware upgrades, software upgrades, swapping of certain hardware components for alternative hardware components with better performance, etc. In some embodiments recommended changes will be automatically implemented, if requested by the customer, in block 1009. The automatic comparisons of enterprises with other enterprises or with enterprise models is an advantage over the prior art because it enables prepackaged enterprises or mini-data centers to be deployed where the prepackaged enterprises are configured identically. In this way, maintenance costs are reduced and setup costs are reduced.

In a typical enterprise, the customer will make custom modifications to software and possibly hardware components. In this case, a comparison may yield that the enterprise has drifted, or strayed, from the optimal but the customer may desire that certain components remain at current version levels and not be upgraded. In this case, the comparison of the actual enterprise with the optimal enterprise would yield a list of recommendations and the customer can selectively choose whether or not the recommendations should be implemented.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A method for comparing configurations of two or more virtual networks, in a utility data center, said method comprising:
   retrieving configuration data for a first virtual network in the two or more virtual networks controlled by a control plane cluster in a data center, wherein each virtual network is associated with a respective enterprise having an enterprise type and comprises a respective plurality of components;
   selecting a second virtual network associated with a respective enterprise based on the criteria of having the same enterprise type as the enterprise associated with the first virtual network;
   retrieving configuration data for the second virtual network, wherein the second virtual network comprises a respective plurality of components;
   retrieving user feedback data for the enterprise type, wherein the user feedback data comprises performance feedback data for the enterprise type based on user experience with the enterprise type;
   retrieving measured performance data associated with the enterprise type;
   comparing the retrieved configuration data for the first and second virtual networks, the retrieved user feedback data and the retrieved measured performance data; and
   determining an optimal configuration model for at least one of the first and second virtual networks based on the comparison of the retrieved configuration data for the first and second virtual networks, the retrieved user feedback data and the retrieved measured performance data.

2. The method as recited in claim 1, wherein the configuration data for the first and second virtual networks is retrieved directly from the respective pluralities of components by a network operation center (NOC) through one or more firewalls.

3. The method as recited in claim 1, further comprising:
   comparing the optimal configuration model with at least one of the first and second virtual networks;
   determining a differential between the optimal configuration model and the at least one of the first and second virtual networks based on the comparing.

4. The method as recited in claim 3, further comprising:
   altering a configuration of one or more components of the plurality of components in the at least first and second virtual networks based on the determined differential.

5. The method as recited in claim 4, wherein the altering comprises:
   upgrading a software version for one or more components of the plurality of components in the at least first and second virtual networks.

6. The method as recited in claim 4, wherein the altering comprises:
   upgrading hardware for one or more components of the plurality of components in the at least first and second virtual networks.

7. The method as recited in claim 3, further comprising:
   filtering an expected configuration difference from the determined differential.

8. The method as recited in claim 1, wherein the configuration data for the first and second virtual networks is retrieved from a backup image of the respective pluralities of components.

9. A system for comparing virtual networks associated with enterprises, in a utility data center, comprising:
   two or more virtual networks in a data center, wherein each virtual network is associated with a respective enterprise having an enterprise type and comprises a respective plurality of components;
   a control plane cluster in the data center, wherein the control plane cluster is adapted to control at least one of the two or more virtual networks in the data center;
   a network operation center (NOC), wherein the NOC is adapted to communicate with the control plane cluster through one or more firewalls and retrieve configuration data for each of the two virtual networks in the data center;
   a user feedback database storing performance feedback data for the enterprise type based on user experience with the enterprise type;
   a performance database storing measured performance data associated with the enterprise type; and
   an enterprise configuration comparator, wherein the enterprise configuration comparator is adapted to compare the retrieved configuration data for each of the two virtual networks, the user feedback data and the measured performance data and to determine an optimal configuration model for at least one of the two virtual networks based on the retrieved configuration data for each of the two virtual networks, the user feedback data and the measured performance data.

10. The system of claim 9, further comprising:
one or more firewalls, wherein the NOC is adapted to retrieve the configuration data from the respective plurality of components of each of the two virtual networks through the one or more firewalls.

11. The system of claim 9, wherein the enterprise configuration comparator is adapted to compare the optimal configuration model with at least one of the two virtual networks and to determine a differential between the optimal configuration model and the at least one of the two virtual networks based on the comparing.

12. The system of claim 11, wherein the control panel cluster is adapted to alter a configuration of one or more components of the plurality of components of two virtual networks based on the determined differential.

13. The system of claim 12, wherein the control panel cluster is adapted to upgrade a software version of the one or more components of the plurality of components of two virtual networks based on the determined differential.

14. The system of claim 11, wherein the enterprise configuration comparator provides a recommendation for upgrading hardware of one or more components of the plurality of components of two virtual networks based on the determined differential.

15. The system of claim 11, wherein the enterprise configuration comparator is adapted to filter an expected configuration difference from the determined differential.

16. The system of claim 9, wherein the NOC is adapted to retrieve the configuration data for each of the two virtual networks in the data center from a backup image of the respective pluralities of components of each virtual network.

* * * * *

UNITED STATES PATENT AND TRADEMARK OFFICE
CERTIFICATE OF CORRECTION

PATENT NO.       : 7,373,399 B2  
APPLICATION NO.  : 10/140933  
DATED            : May 13, 2008  
INVENTOR(S)      : Doug Steele et al.

Page 1 of 1

It is certified that error appears in the above-identified patent and that said Letters Patent is hereby corrected as shown below:

In column 9, line 59, delete "intranet" and insert -- infranet --, therefor.

Signed and Sealed this

Twenty-ninth Day of July, 2008

JON W. DUDAS  
*Director of the United States Patent and Trademark Office*